UNITED STATES PATENT OFFICE.

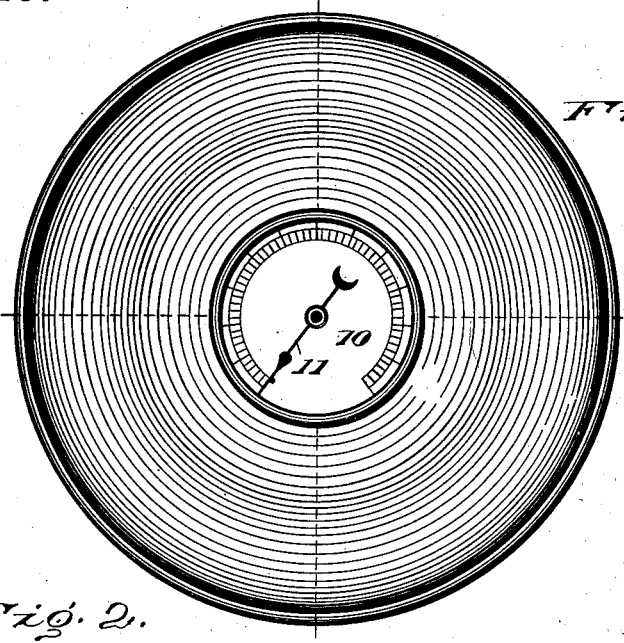
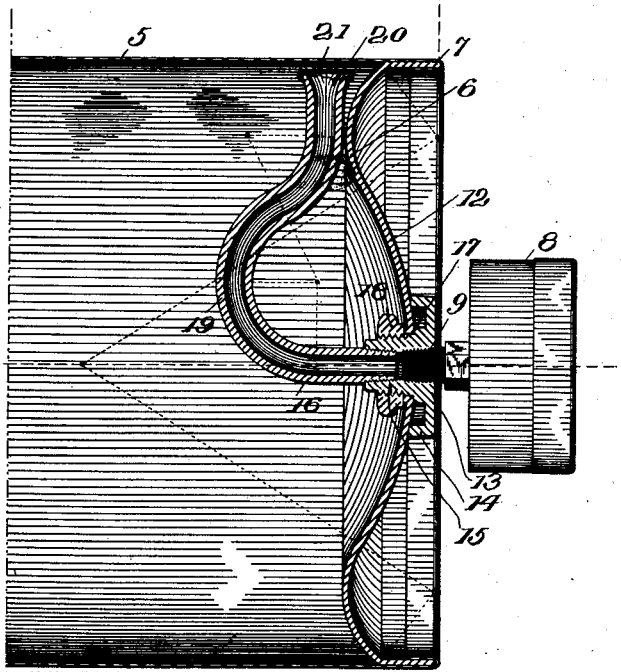
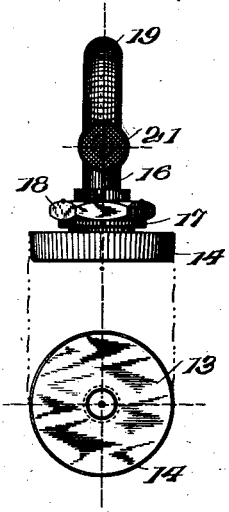

AARON J. TYLER, OF ROCHESTER, NEW YORK, ASSIGNOR TO F. S. BIDWELL, OF SHORTSVILLE, NEW YORK.

PRESSURE-GAGE FOR SPRAYING-TANKS.

1,047,719.  Specification of Letters Patent. Patented Dec. 17, 1912.

Application filed July 28, 1911. Serial No. 641,074.

*To all whom it may concern:*

Be it known that I, AARON J. TYLER, citizen of the United States, residing at Rochester, in the county of Monroe and State of New York, have invented certain new and useful Improvements in Pressure-Gages for Spraying-Tanks, of which the following is a specification.

This invention relates to pressure gages for portable automatic spraying tanks of that general class shown and described in my pending application filed in the United States Patent Office on the 31st day of March 1911, under Serial No. 618,153.

In charging the spraying tank shown in my pending application referred to, the tank is placed on end and air under pressure forced within the tank by means of a suitable hand operated pump, the spraying solution being subsequently introduced into said tank which effects a further compression of the air so that when the tank is placed in a horizontal position and the device operated, the spraying solution will be thoroughly atomized. Owing to the nature of the spraying mixture or solution used in this class of tanks, considerable difficulty has been experienced in attaching a pressure gage thereto, as the foreign matter in the mixture or solution has a tendency to enter the tube leading to the gage and cake or solidify therein, thus interfering with the proper working of the gage and rendering the latter practically useless after a short period of service.

The primary object of the present invention is to provide a gage of simple and durable construction capable of being readily attached to one end of a spraying tank and by means of which the air pressure may be conveniently indicated, when the tank is in either a horizontal or vertical position without liability of the spraying solution entering the gage and obstructing or otherwise interfering with the operation thereof.

A further object is to provide a gage including a bent tube, one end of which is operatively connected with the body of the gage and the other end thereof extended to a point near one side wall of the spraying tank and provided with a screen, the bend of said tube being adapted to contain water or other liquid, which latter forms a water seal for the joints of the gage and tube and also serves to protect the delicate operating mechanism of the gage from the deleterious action of the spraying solution.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a front elevation of a spraying tank provided with a pressure gage constructed in accordance with my invention; Fig. 2 is a longitudinal sectional view of one end of the tank, showing the gage in position thereon; Fig. 3 is a top plan view of the bent tube and supporting bracket detached, a bottom plan view of the bracket being shown immediately below the same.

Corresponding and like parts are referred to in the following description and indicated in all the views of the drawing by the same reference characters.

The improved pressure gage forming the subject matter of the present invention is principally designed for attachment to the tanks or containers of automatic spraying apparatus and by way of illustration is shown in connection with a spraying tank of the construction shown in my prior application above referred to, in which 5 designates the tank or container and 6 one head thereof, the latter being preferably concave in cross section and having its marginal edge retained in position on the tank by bending the side walls thereof, an indicated at 7.

The gage comprises a shell or casing 8 having its rear portion provided with a threaded extension 9 and its front portion provided with a graduated dial 10, over which is movable a hand or pointer 11 for indicating the pressure of air within the tank or container. Bearing against the convex face 12 of the head 6, is a supporting bracket 13 having a circumferential flange 14 for engagement with the head 6 and a centrally disposed nipple 15 preferably arranged concentric with the flange 14. The interior wall of the nipple 15, at the outer flat face of the bracket 13, is threaded for engagement with the extension 9, while the interior wall of the nipple, at the inner end thereof, is also threaded for engagement with the correspondingly threaded end of a pipe or tube indicated at 16. The outer wall of the nipple 15 is provided with a square shoulder 17 which bears against the adjacent face of the head 6 and is held in engagement therewith by a clamping nut 18. The intermediate portion of the pipe or tube 16 is curved laterally at 19, while the free end thereof is bent toward the head and then toward the wall and extended to a point near the adjacent side wall of the tank or container 5. The free end of the tube 16 is flared laterally at 20 and provided with a screen 21 which fits over the terminal of the tube and serves to prevent foreign particles in the spraying mixture or solution from entering the tube and obstructing or otherwise interfering with the operation of the gage. The body of the gage 8 is preferably fastened directly on the head of the tank or container 5 so that when the tank is inverted, that is to say, placed in an upright or vertical position and the pump (not shown) actuated to force compressed air within the tank, the operator, by merely glancing at the dial 10, may ascertain the pressure of air within said tank. It will here be noted that the flared end of the tube or pipe 16 terminates just below the upper portion of the tank or container when the latter is held in a horizontal position so as to keep the intake of the gage as far as possible from the level of the spraying mixture or solution in the tank. The bend 19 of the gage tube is preferably filled with pure water, which water forms in effect a liquid seal for the joints of the gage and tube and also serves to protect the delicate operating mechanism of said gage. Thus it will be seen that the screen 21 serves to prevent the entrance of heavy foreign particles into the gage tube, while the water in the bend of said tube, not only forms a liquid seal, but also serves to prevent the body of the mixture or solution from affecting the operating mechanism of the dial. It will also be observed that when the tank is placed on end, with the gage uppermost, as in the act of forcing air therein, the bend 19 of the tube will form in effect a trap, and that when the tank is placed in a horizontal position and used for spraying purposes, a portion of the liquid in the bend 19 will flow to the body of the gage and thus prevent leakage of air, as before stated. It will of course be understood that the air acts directly on the body of water or liquid in the tube, which water or liquid in turn serves to actuate the gage.

Having thus described the invention, what is claimed as new is:

1. The combination with a spraying tank, of a pressure gage secured upon the end of the tank, and a tube within the tank having one end connected directly to the gage, the opposite end of the tube being open and the tube being doubled on itself to approach the end of the tank and then bent laterally to terminate adjacent the wall of the tank.

2. The combination with a spraying tank having an end wall, of a bracket bearing against the outer face of said end wall and provided with a threaded opening, a pressure gage having a stem threaded in said opening, and a tube connected with the bracket and having its free end extended laterally within the tank to a point near one wall thereof, the intermediate portion of the tube being bent to form a pocket for a sealing liquid.

3. The combination with a spraying tank having a head, of a bracket having an annular axially extending flange for engagement with the head and a central nipple extending through the head, a pressure gage secured in the outer end of the nipple, and a tube secured in the inner end of the nipple and having its intermediate portion bent laterally and its free end extended within the tank to a point near one wall thereof.

4. The combination with a spraying tank having a head, of a bracket having an axial annular flange bearing against the outer face of the head and provided with an interiorly and exteriorly threaded nipple, there being an annular shoulder formed on the nipple for contact with the outer face of the head of the tank, a pressure gage having a threaded extension engaging some of the interior threads on the bracket, a tube having one end thereof engaging other of the interior threads on the bracket, said tube having its intermediate portion bent laterally and its free end extended within the tank to a point near one wall thereof, a screen forming a closure for the free end of the tube, and a clamping nut engaging the exterior threads on the nipple and bearing against the concave face of the head of the tank for forcing said head into engagement with the shoulder.

In testimony whereof, I affix my signature in presence of two witnesses.

AARON J. TYLER. [L. S.]

Witnesses:
 HERBERT LEARY,
 ADELAID A. MILLER.